(12) United States Patent
Omori et al.

(10) Patent No.: US 11,930,188 B2
(45) Date of Patent: Mar. 12, 2024

(54) REFERENCE REGION DETERMINATION APPARATUS AND PROGRAM

(71) Applicant: NIPPON TELEGRAPH AND TELEPHONE CORPORATION, Tokyo (JP)

(72) Inventors: Yuya Omori, Musashino (JP); Takayuki Onishi, Musashino (JP); Hiroe Iwasaki, Musashino (JP); Atsushi Shimizu, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 231 days.

(21) Appl. No.: 17/422,425

(22) PCT Filed: Jan. 6, 2020

(86) PCT No.: PCT/JP2020/000020
§ 371 (c)(1),
(2) Date: Jul. 12, 2021

(87) PCT Pub. No.: WO2020/149159
PCT Pub. Date: Jul. 23, 2020

(65) Prior Publication Data
US 2022/0124350 A1 Apr. 21, 2022

(30) Foreign Application Priority Data
Jan. 15, 2019 (JP) .................................. 2019-004728

(51) Int. Cl.
*H04N 19/167* (2014.01)
*H04N 19/105* (2014.01)
(Continued)

(52) U.S. Cl.
CPC ......... *H04N 19/167* (2014.11); *H04N 19/105* (2014.11); *H04N 19/137* (2014.11); *H04N 19/176* (2014.11)

(58) Field of Classification Search
CPC .... H04N 19/176; H04N 19/52; H04N 19/105; H04N 19/513; H04N 19/159;
(Continued)

(56) References Cited

U.S. PATENT DOCUMENTS 5,754,237 A * 5/1998 Jung ...................... H04N 19/53
375/E7.107
5,793,429 A * 8/1998 Kim ....................... H04N 19/53
375/E7.107
(Continued)

FOREIGN PATENT DOCUMENTS

JP 2011151509 A * 8/2011

OTHER PUBLICATIONS

Takayuki Onishi et al., Single-chip 4K 60fps 4:2:2 HEVC Video Encoder LSI with 8K Scalability, 2015 Symposium on VLSI Circuits Digest of Technical Papers, Jun. 17, 2015, pp. C54-C55.
(Continued)

*Primary Examiner* — Daniel Chang
(74) *Attorney, Agent, or Firm* — Harness, Dickey & Pierce, P.L.C.

(57) ABSTRACT

A reference region determination device is for determining a reference region to be stored in a reference image buffer, and includes: a motion vector acquisition portion configured to acquire a motion vector for each one of already encoded blocks; a position change amount derivation portion configured to derive a position change amount for the reference region based on the acquired motion vectors; and a reference region determination portion configured to determine a position of the reference region to be used in encoding of a
(Continued)

next block for encoding after the already encoded blocks based on the position change amount.

12 Claims, 14 Drawing Sheets

(51) Int. Cl.
*H04N 19/137* (2014.01)
*H04N 19/176* (2014.01)
(58) Field of Classification Search
CPC .... H04N 19/51; H04N 19/139; H04N 19/573; H04N 19/577; H04N 19/137
See application file for complete search history.

(56) References Cited

U.S. PATENT DOCUMENTS

| | | | | |
|---|---|---|---|---|
| 6,263,112 B1* | 7/2001 | Watanabe | .............. | H04N 19/51 375/E7.102 |
| 7,203,237 B2* | 4/2007 | Fernandes | .............. | H04N 19/59 382/250 |
| 7,342,962 B2* | 3/2008 | Fernandes | .............. | H04N 19/40 348/448 |
| 7,412,003 B2* | 8/2008 | Fernandes | .............. | H04N 19/40 348/402.1 |
| 10,448,048 B2* | 10/2019 | Kim | .............. | H04N 19/521 |
| 2001/0002922 A1* | 6/2001 | Hayashi | .............. | H04N 5/145 348/700 |
| 2002/0172287 A1* | 11/2002 | Kim | .............. | H04N 5/145 375/E7.122 |
| 2007/0153898 A1* | 7/2007 | Yim | .............. | H04N 19/895 375/240.27 |
| 2009/0003450 A1* | 1/2009 | Takahashi | .............. | H04N 7/012 375/E7.076 |
| 2013/0163668 A1* | 6/2013 | Chen | .............. | H04N 19/463 375/240.14 |
| 2016/0050411 A1* | 2/2016 | Wang | .............. | H04N 19/192 375/240.16 |
| 2016/0134887 A1* | 5/2016 | Kazui | .............. | H04N 19/176 375/240.08 |
| 2018/0131960 A1* | 5/2018 | Wang | .............. | H04N 19/523 |
| 2018/0241998 A1* | 8/2018 | Chen | .............. | H04N 19/109 |
| 2018/0343448 A1* | 11/2018 | Possos | .............. | H04N 19/176 |
| 2019/0246118 A1* | 8/2019 | Ye | .............. | H04N 19/176 |
| 2020/0228823 A1* | 7/2020 | Yamori | .............. | H04N 19/159 |

OTHER PUBLICATIONS

Jongpil Jung et al., A Dynamic Search Range Algorithm for Stabilized Reduction of Memory Traffic in Video Encoder, IEEE Transactions on Circuits and Systems for Video Technology, vol. 20, No. 7, 2010, pp. 1041-1046.

* cited by examiner

Fig. 14

| AVERAGE ERROR PER PIXEL | WEIGHT COEFFICIENT FOR CUMULATIVE DIFFERENCE VALUE |
|---|---|
| ≤0.25 | 10 |
| ≤0.50 | 9 |
| ≤1.00 | 7 |
| ... | ... |
| >10.00 | 1 |

REFERENCE REGION DETERMINATION APPARATUS AND PROGRAM

CROSS-REFERENCE TO RELATED APPLICATIONS

This application is a 371 U.S. National Phase of International Application No. PCT/JP2020/000020 filed on Jan. 6, 2020, which claims priority to Japanese Application No. 2019-004728 filed on Jan. 15, 2019. The entire disclosures of the above applications are incorporated herein by reference.

TECHNICAL FIELD

The present invention relates to a reference region determination device and a program.

BACKGROUND ART

Existing moving image encoding standards include MPEG (Moving Picture Experts Group)-2, MPEG-4, MPEG-4/AVC (Advanced Video Coding), etc. HEVC (High Efficiency Video Coding) is a next-generation moving image encoding standard expected to be popular in future.

The encoding efficiency of HEVC is approximately double that of MPEG-4/AVC, which is a conventional encoding scheme. Along with improvement in the encoding efficiency, moving images of high spatial resolution such as 4K (3840 pixels×2160 lines) and 8K (7680 pixels×4320 lines) are now subjects of encoding. In a hierarchical encoding process, a size that maximizes the encoding efficiency is selected from among different sizes of encoding blocks, thereby improving the encoding efficiency for encoding blocks to be encoded (hereinafter referred to as "encoding target blocks") in an encoding target frame.

In the hierarchical encoding process, an encoding device performs inter-frame encoding, which involves searching for, estimating and compensating for a motion vector between the encoding target frame and a reference image frame. Hereinafter, a cumulative value of the difference in pixel units between the reference image in the reference image frame and an image of the encoding target block will be called a "cumulative difference value". A search module of the encoding device estimates a motion vector by hierarchically searching for a motion vector that indicates a position (coordinates) at which the cumulative difference value and the like are minimized in the reference image frame for each one of encoding target blocks of different sizes. Hereinafter, data representing the pixel value of each pixel in the reference image frame will be called "reference image data".

The hierarchical encoding process requires a huge amount of reference image data. Since the data size of the entire reference image data corresponding to all the reference image frames is very large, an LSI (Large Scale Integration) can only store a portion of the entire reference image data in a reference image buffer provided inside the LSI. Accordingly, it is necessary for an external memory to store all the reference image data. Data transfer speed at an interface of the external memory is limited. In order that the search module can read particular reference image data that is required when inter-frame encoding is performed out of all the reference image data in the external memory in real time, the LSI temporarily stores reference image data transferred from the external memory in the reference image buffer provided inside the LSI. The LSI supplies the reference image data temporarily stored in the reference image buffer to the search module.

In order to curb the transfer rate of reference image data transferred from the external memory, there has been a proposal of a reference image buffer that stores reference image data equivalent to the horizontal width (lines) of the encoding target frame (Non-Patent Literature 1). In encoding standards such as HEVC, encoding target blocks are encoded in raster scan order. A motion vector search range is a range centered at a predetermined position in the reference image frame. The motion vector search range is rectangular in shape.

In some cases, the search module performs a motion vector searching process on the condition that the positional relationship between the position of the encoding target block in the encoding target frame and the position of the search center for the motion vector in the reference image frame is constant. In such a case, by storing reference image data equivalent to "(the horizontal width of the encoding target frame)×(the vertical width of the search range)" in the reference image buffer as buffer data, it is no longer necessary for the reference image buffer to update the buffer data even when the encoding target block is updated to an encoding target block on the right (in horizontal direction) on the same line. During performance of an encoding process on the encoding target block on one line formed from multiple encoding blocks, the external memory transfers new data equivalent to "(the horizontal width of the encoding target frame)×(the vertical width of the search range)" to the reference image buffer. By doing so, the transfer rate of reference image data transferred from the external memory to the reference image buffer is limited at "(the horizontal width of the encoding target block)×(the vertical width of the encoding target block)/processing time for one encoding target block".

Buffer size is approximately equal to "(the horizontal width of the encoding target frame)×(the vertical width of the search range)". As such, for encoding of a moving image of high spatial resolution such as 4K or 8K, the reference image buffer has an increased size and it can deteriorate the scale, size, and electric power of the LSI.

One possible method for keeping the size of the reference image buffer low can be that the reference image buffer always stores only reference image data for the motion vector search range for the encoding target block that is currently undergoing the encoding process. In a case where the shape of the search range centered at a position lying at a certain distance from the encoding target block is rectangular and the encoding target block currently undergoing the encoding process is updated to the right on the same line, an overlapping area of the motion vector search ranges for the respective encoding blocks becomes large. Reference image data that newly requires transfer due to updating of the encoding target block currently undergoing the encoding process in upward direction on the same line is just reference image data equivalent to the horizontal width of the encoding block that is located to the right of the search range. In this case, the size of the reference image buffer is approximately equal to "(the horizontal width of the search range)× (the vertical width of the search range)". The transfer rate of reference image data transferred from the external memory to the reference image buffer is limited to "(the horizontal width of the encoding block)×(the vertical width of the search range)/processing time for one encoding target block". This enables transfer of a moving image of high spatial resolution such as 4K or 8K at a realistic transfer rate.

CITATION LIST

Non-Patent Literature

Non-Patent Literature 1: Takayuki Onishi, Takashi Sano, Yukikuni Nishida, Kazuya Yokohari, Jia Su, Ken Nakamura, logo Nitta, Kimiko Kawashima, Jun Okamoto, Naoki Ono, Ritsu Kusaba, Atsushi Sagata, Hiroe Iwasaki, Mitsuo Ikeda, and Atsushi Shimizu, "Single-chip 4K 60 fps 4:2:2 HEVC video encoder LSI with 8K scalability," Symposium on VLSI Circuits Digest of Technical Papers, C54-C55, 2015.

SUMMARY OF THE INVENTION

Technical Problem

However, several conditions must be satisfied in the case where the reference image buffer always stores only the reference image data of the motion vector search range for the encoding target block that is currently undergoing the encoding process. Specifically, it is necessary to satisfy conditions that the shape of the search range is rectangular, that a position vector of the search center for the encoding target block is constant between the encoding target frame and the reference image frame, and that the position vector is already determined prior to start of the encoding process on the encoding target frame.

Various motion vectors can occur from one encoding block to another even in the same encoding target frame. As such, when the condition that the position vector of the search center for the encoding block is constant between the encoding target frame and the reference image frame is satisfied, it is possible that for some encoding blocks, the motion vector that minimizes the cumulative difference value (the best motion vector) indicates a region of reference image data that is not stored in the reference image buffer. In this case, there can be increase in the amount of code and reduction in encoding efficiency.

For making the best motion vector indicate a region of reference image data that is stored in the reference image buffer as much as possible, the search range for reference image data which will be stored in the reference image buffer has to be larger. This leads to increase in the size of data capacity of the reference image buffer and in the transfer rate of the reference image data transferred from the external memory. Thus, the position of the search center about which motion searching process is performed should be determined with finer granularity than in units of the encoding target frame (e.g., in units of encoding blocks or in units of the lines of encoding blocks). When reference image data equivalent to the horizontal width of the reference image frame has been stored in the reference image buffer, all the reference image data of the reference image frame in the horizontal direction has been stored in the reference image buffer. This allows the search module of the encoding device to flexibly change the position of the search center for the motion vector in the horizontal direction in the reference image frame. The search module of the encoding device can also determine a position change amount (an amount of hopping) in the horizontal direr-ton for the motion vector search range in the reference image frame in units of encoding blocks.

However, a conventional encoding device (a reference region determination device) may not deter reduction in the encoding efficiency when the buffer stores reference image data for only a portion of the reference image frame.

In view of these circumstances, the present invention is aimed at providing a reference region determination device and a program that can deter reduction in the encoding efficiency even when a buffer stores reference image data for only a portion of the reference image frame.

Means for Solving the Problem

An aspect of the present invention is a reference region determination device for determining a reference region to be stored in a reference image buffer, the reference region determination device including: a motion vector acquisition portion configured to acquire motion vector for each one of already encoded blocks; a position change amount derivation portion configured to derive a position change amount for the reference region based on the acquired motion vectors; and a reference region determination portion configured to determine a position of the reference region to be used in encoding of a next block for encoding after the already encoded blocks based on the position change amount.

An aspect of the present invention is the reference region determination device set forth above, wherein the motion vector acquisition portion acquires the motion vector for each already encoded block out of the already encoded blocks that belongs to a line immediately preceding a line to which the block for encoding belongs.

An aspect of the present invention is the reference region determination device set forth above, wherein the position change amount derivation portion derives the position change amount in a vertical direction based on a representative value of vertical component amounts of the acquired motion vectors.

An aspect of the present invention is the reference region determination device set forth above, wherein the representative value is a median or an average of the vertical component amounts of the acquired motion vectors.

An aspect of the present invention is the reference region determination device set forth above, wherein the position change amount derivation portion derives the position change amount based on the acquired motion vectors and on division information for the already encoded blocks.

An aspect of the present invention is the reference region determination device set forth above, wherein the position change amount derivation portion derives the position change amount according to accuracy of the acquired motion vectors.

An aspect of the present invention is a program for causing a computer to function as the reference region determination device set forth above.

Effects of the Invention with the present invention, it is possible to deter reduction in the encoding efficiency even when a buffer stores reference image data for only a portion of the reference image frame.

BRIEF DESCRIPTION OF DRAWINGS

FIG. 14 shows an example of a weight coefficient table for cumulative difference values in the second embodiment.

DESCRIPTION OF EMBODIMENTS

Embodiments of the present invention are described below in detail with reference to the drawings.

In the following, the encoding block is macroblock in the "MPEG-2" or the "H.264/AVC" standard. The encoding block is a Coding Unit (CU) or a Prediction Unit (PU) in HEVC. Coding Units constitute a Coding Tree Unit (CTU).

First Embodiment

Figure 1:
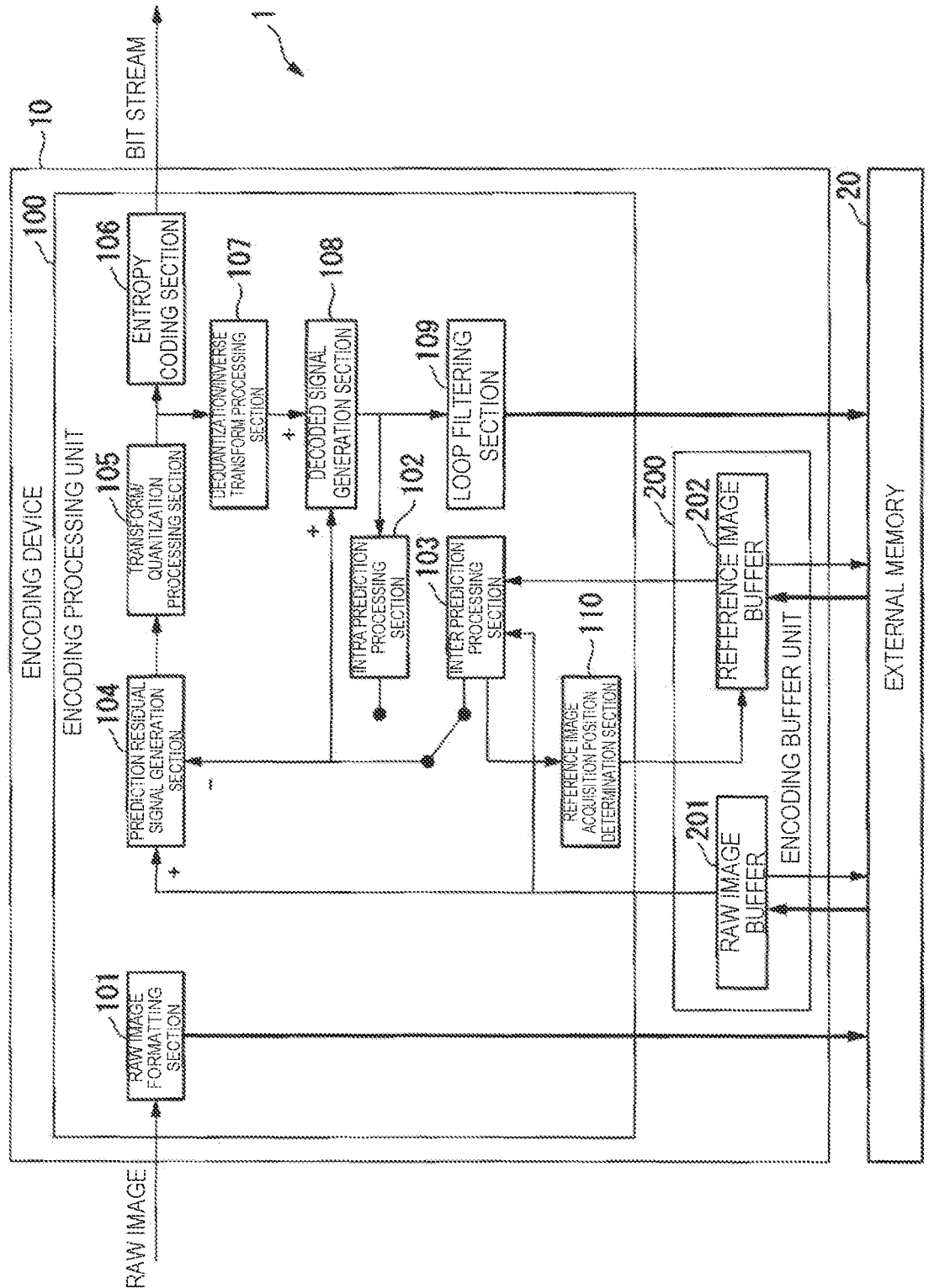
FIG. 1 shows an exemplary configuration of an encoding system in a first embodiment.

FIG. 1 shows an exemplary configuration of an encoding system 1. The encoding system 1 includes an encoding device 10 and an external memory 20. The encoding device 10 is a device that determines a region of reference image data (reference region) which is stored in a reference image buffer in encoding of a moving image (a reference region determination device). The encoding device 10 is connected with the external memory 20. The encoding device 10 records raw image data (frames of a moving image) and reference image data in the external memory 20.

The encoding device 10 acquires recorded raw image data and reference image data from the external memory 20. The encoding device 10 encodes the raw image data based on designated parameters and reference image data.

The external memory 20 is a volatile recording medium, e.g., DRAM (Dynamic Random Access Memory). The external memory 20 may also be a nonvolatile recording medium (non-transitory recording medium), e.g., flash memory. The external memory 20 stores formatted raw image data, for example.

In the following, the encoding device 10 performs a moving image encoding process such as "H.264/AVC" and HEVC as an example. The encoding device 10 performs the encoding process in units of encoding blocks.

The exemplary configuration of the encoding device 10 is described in more detail.

The encoding device 10 includes an encoding processing unit 100 and an encoding buffer unit 200. The encoding processing unit 100 includes a raw image formatting section 101, an intra prediction processing section 102, an inter prediction processing section 103, a prediction residual signal generation section 104, a transform/quantization processing section 105, an entropy coding section 106, a dequantization/inverse transform. processing section 107, a decoded signal generation section 108, a loop filtering section 109, and a reference image acquisition position determination section 110.

Some or all of the functional components of the encoding device 10 are embodied by means of hardware such as LSI, for example. Some or all of the functional components of the encoding device 10 may also be embodied as software via execution of programs stored in a storage by a processor such as a CPU (Central Processing Unit).

The encoding buffer unit 200 includes a raw image buffer 201 and a reference image buffer 202. The encoding buffer unit 200 is a volatile recording medium, e.g., SPAN (Static Random Access Memory). The encoding buffer unit 200 stores raw image data and reference image data, for example.

The exemplary configuration of the encoding processing unit 100 is described in detail.

The raw image formatting section 101 acquires raw image data (frames of a moving image) in raster scan order. The raw image formatting section 101 formats the raw image data into units of encoding blocks. The raw image formatting section 101 outputs the raw image data in units of encoding blocks to the external memory 20.

The intra prediction processing section 102 acquires a decoded signal from the decoded signal generation section 108. The intra prediction processing section 102 performs intra prediction on a target frame of the decoded signal.

The inter prediction processing section 103 acquires the raw image data in units of encoding blocks from the raw image buffer 201. The inter prediction processing section 103 acquires a filtered decoded signal from the reference image buffer 202 as a reference image signal. The inter prediction processing section 103 performs motion searching process between frames.

The prediction residual signal generation section 104 acquires the raw image data in units of encoding blocks from the raw image buffer 201. The prediction residual signal generation section 104 acquires a prediction signal from the intra prediction processing section 102 or the inter prediction processing section 103. Where the prediction residual signal generation section 104 acquires a prediction signal from the intra prediction processing section 102, the prediction signal contains information representing a result of intra prediction. Where the prediction residual signal generation section 104 acquires a prediction signal from the inter prediction processing section 103, the prediction signal contains information representing a result of inter prediction. The prediction residual signal generation section 104 outputs the difference between the raw image data and the prediction signal to the transform/quantization processing section 105 as a prediction residual signal.

The transform/quantization processing section 105 performs orthogonal transform such as discrete cosine transform on the prediction residual signal. The transform/quantization processing section 105 quantizes transform coefficients. The transform/quantization processing section 105 outputs the quantized transform coefficients to the entropy coding section 106 and the dequantization/inverse transform processing section 107.

The entropy coding section 106 entropy-codes the quantized transform coefficients. The entropy coding section 106 outputs a bit stream of the entropy-coded quantized transform coefficients to an external device, which may be a decoding device or the like. In this manner, the encoding device 10 transmits the search result from the motion searching process to the external device, which may be a decoding device or the like.

The dequantization/inverse transform processing section 107 acquires the quantized transform coefficients from the transform/quantization processing section 105. The dequantization/inverse transform processing section 107 performs dequantization and inverse orthogonal transform processing on the quantized transform coefficients. The dequantization/ inverse transform processing section 107 outputs a prediction residual decoded signal, which is the result of the dequantization and the inverse orthogonal transform processing, to the decoded signal generation section 108.

The decoded signal generation section 108 acquires the prediction signal from the intra prediction processing section 102 or the inter prediction processing section 103. The decoded signal generation section 108 generates a decoded signal for the encoded target block by adding the prediction residual decoded signal and the prediction signal together.

The loop filtering section 109 performs filtering for reducing encoding distortion on the decoded signal. The loop filtering section 109 outputs the filtered decoded signal to the external memory 20 as a reference image signal.

The reference image acquisition position determination section 110 acquires a motion vector search result with inter prediction from the inter prediction processing section 103. The reference image acquisition position determination section 110 analyzes motion vector information and the like based on the motion vector search result. The reference image acquisition position determination section 110 determines a region (coordinates) of reference image data to be stored in the reference image buffer 202 among positions on the reference image frame based on a result of analysis of the motion vector information and the like. The reference image acquisition position determination section 110 outputs position information for the region of reference image data to be stored in the reference image buffer 202 to the reference image buffer 202.

The raw image buffer 201 outputs a read request signal to the external memory 20. The raw image buffer 201 temporarily stores the raw image data for each encoding block which is transferred from the external memory 20 in response to the read request signal in the raw image buffer 201.

The reference image buffer 202 acquires the position information for the region of reference image data which is to be stored in the reference image buffer 202 from the reference image acquisition position determination section 110. The reference image buffer 202 outputs a read request signal to the external memory 20 based on the position information for the region of reference image data. The reference image buffer 202 temporarily stores the reference image data which is transferred from the external memory 20 in response to the read request signal in the reference image buffer 202. In this manner, the reference image buffer 202 acquires reference image data required for the motion searching process from the external memory 20.

Figure 2:
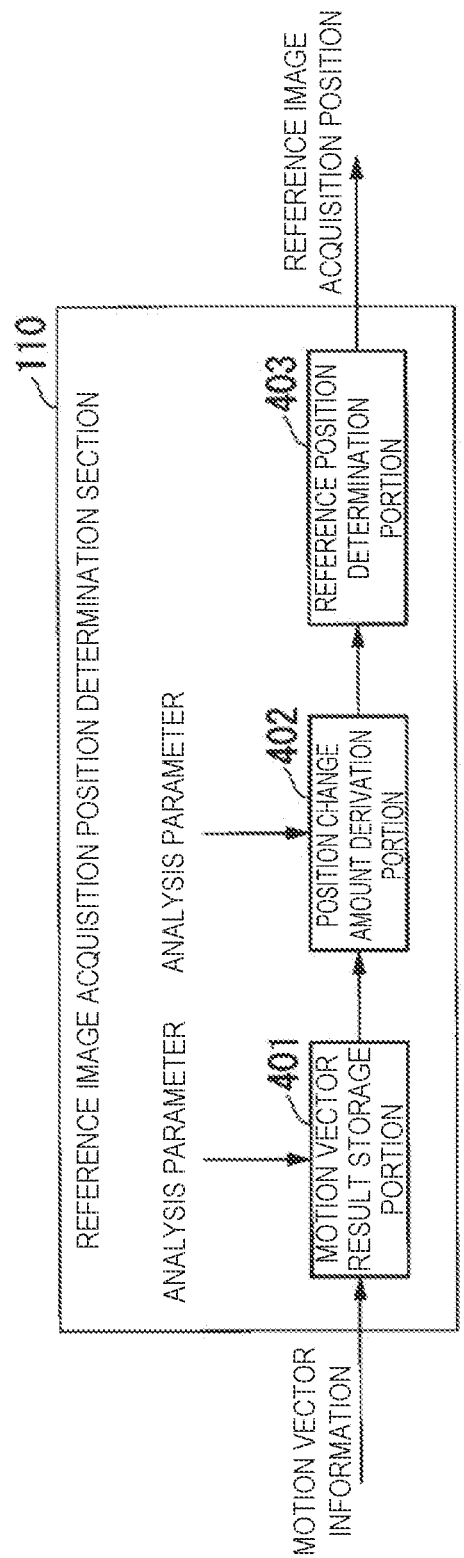
FIG. 2 shows an exemplary configuration of a reference image acquisition position determination section in the first embodiment.

FIG. 2 shows an exemplary configuration of the reference image acquisition position determination section 110. The reference image acquisition position determination section 110 includes a motion vector result storage portion 401, a position change amount derivation portion 402, and a reference position determination. portion 403.

The motion vector result storage portion 401 acquires motion vector information from the inter prediction processing section 103. The motion vector result storage portion 401 sequentially stores the acquired motion vector information in the motion vector result storage portion 401.

The motion vector result storage portion 401 acquires an analysis start position parameter representing a fixed value as one of analysis parameters. Based on the analysis start position parameter, the motion vector result storage portion 401 stores motion vector information for each of the encoding blocks ranging from an encoding block at a position that precedes by one or more blocks (a fixed value) to the encoding block at the immediately preceding position, with respect to the position of the encoding target block that is currently undergoing the encoding process.

The position change amount derivation portion 402 acquires one or more pieces of motion vector information for already encoded encoding blocks from the motion vector result storage portion 401. That is, the position change amount derivation portion 402 acquires past motion vector information from the motion vector result storage portion 401.

The position change amount derivation portion 402 analyzes the vertical component amounts (amount of motion) of motion vectors in the already encoded encoding blocks based on one, or more analysis parameters given by a designer or the like and motion vectors. The position change amount derivation portion 402 derives a representative value of vertical component amounts of the motion vectors based on the result of analysis of the vertical component amounts of the motion vectors. The position change amount derivation portion 402 determines a position change amount (amount of hopping) for the region of reference image data to be stored (hereinafter referred to as "reference image region") among positions on the reference image frame, based on the representative value of the vertical component amounts of the motion vectors.

The reference position determination portion 403 acquires position change amount information for the reference image region from the position change amount derivation portion 402. The reference position determination portion 403 determines the position of the region of the reference image data which is to be stored in the reference image buffer 202 among positions on the reference image frame based on the position change amount information. The reference position determination portion 403 outputs position information for the region of the reference image data which is to be stored in the reference image buffer 202 to the reference image buffer 202 as reference image acquisition position information.

Figure 3:
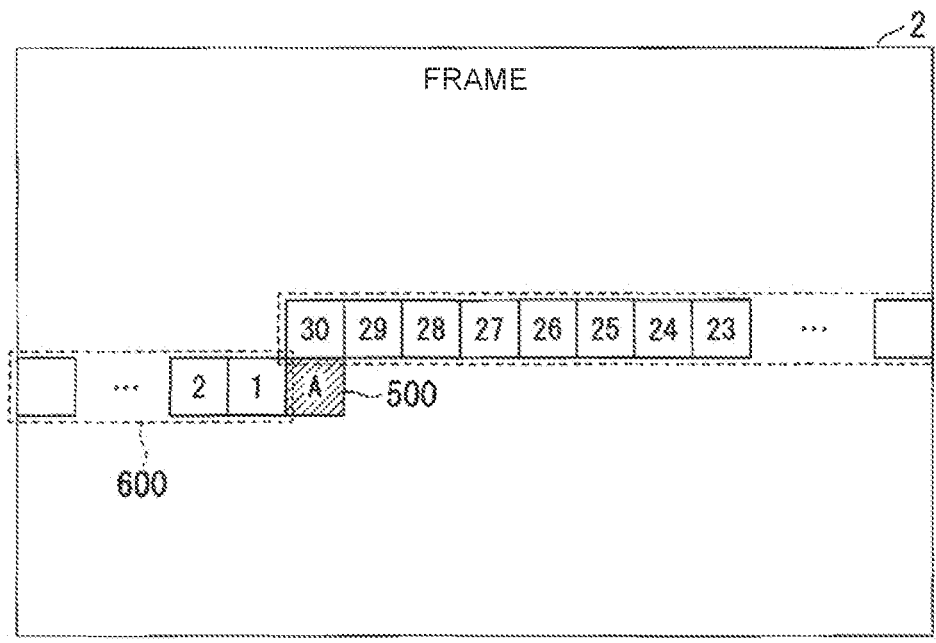
FIG. 3 shows an example of stored reference image data in the first embodiment.

FIG. 3 shows an example of stored reference image data. The value of the analysis start position parameter is 30 as an example. The position vector of the search center for the encoding target block is constant between the encoding target frame and the reference image frame. For the sake of facilitating description, on the entire encoding target frame 2 shown in some figures of the embodiment, the reference image frame is superposed so that the coordinates of the encoding target frame 2 coincide with the coordinates of the reference image frame. The horizontal width of the encoding target frame 2 is 1920 pixels as an example. The encoding target frame 2 contains multiple encoding blocks. The size of the encoding block is 64×64 pixels as an example.

On one line of the encoding target frame, 30 (=1920/64) encoding blocks from an encoding block "1" through an encoding block "30" are arrayed. At a given time, the motion vector result storage portion. 401 stores motion vector information for each of the encoding blocks from the encoding block "1" to the encoding block "30". In FIG. 3, the motion vector result storage portion 401 stores motion vector information for each of the encoding blocks ranging from the encoding block "1" on the left of an encoding target block 500"A", which is the encoding block currently undergoing the encoding process, to the encoding block "30" immediately above the encoding target. block 500"A". In this manner, the motion vector result storage portion 401 may store motion vector information for each of already encoded encoding blocks that belong to the line immediately preceding the line to which the encoding target block 500"A" belongs. A storage target block group 600 is a Group of encoding blocks for which motion vector information is stored.

Where some or all of the functional components of The encoding device 10 are embodied with LSI, for example, processing different from each other is executed on multiple encoding blocks in parallel via pipeline processing of the LSI. As such, the final motion vectors do not have to have been obtained in the encoding block "1", encoding block "2" and so on, which are close to the encoding target block 500 "A". In this case, the motion vector result storage portion 401 stores motion vector information for each of the encoding blocks ranging from an encoding block that precedes by the fixed value represented by the analysis start position parameter to the newest encoding block for which the final motion vector has been obtained, with respect to the position of the encoding target block 500"A". The motion vector result storage portion 401 deletes the oldest motion vector information stored in the reference image buffer 202 every time encoding of an encoding target block is completed. The motion vector result storage portion 401 updates an internal buffer of the motion vector result storage portion 401 by newly storing the newest motion vector from the motion vector searching process in the motion vector result storage portion 401.

The position change amount derivation portion 402 acquires multiple pieces of motion vector information for already encoded encoding blocks from the motion vector result storage portion 401. The motion vector information to be acquired is designated with two parameters, the analysis start position parameter and an analysis end position parameter.

The position change amount derivation portion 402 acquires motion vector information for each of the encoding blocks ranging from the encoding block that precedes by the fixed value represented by the analysis start position parameter to the encoding block that precedes by the fixed value represented by the analysis end position parameter, with respect to the position of the encoding target block 500"A". The position change amount derivation portion 402 sets each acquired motion vector information as a to-be-analyzed motion vector.

Figure 4:
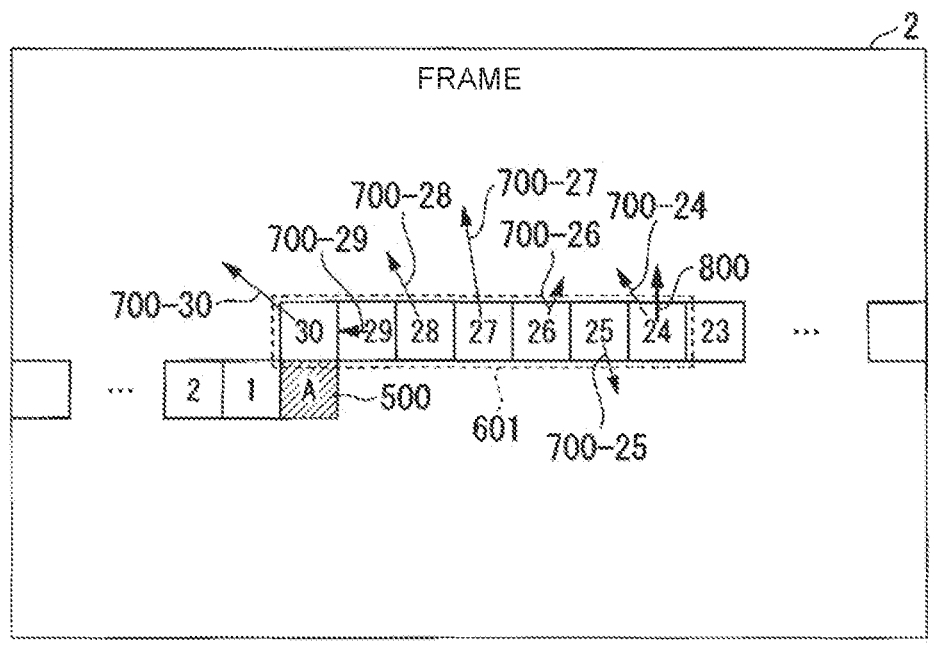
FIG. 4 shows an example of to-be-analyzed motion vectors in the first embodiment.

FIG. 4 shows an example of to-be-analyzed motion vectors. The value of the analysis start position parameter is 30 as an example. The value of the analysis end position parameter is 24 as an example. The position change amount derivation portion 402 analyzes motion vector information for each of the encoding blocks from an encoding block "24" to an encoding block "30".

The position change amount derivation portion 402 derives a representative value of the component amounts of motion vectors based on the result of analysis of multiple pieces of motion vector information. In FIG. 4, the position change amount derivation portion 402 derives a representative value of the vertical component amounts of motion vectors as an example. The position change amount derivation portion 402 determines a position change amount for the reference image region among positions on the reference image frame based on the representative value of the vertical component amounts of the motion vectors. A position change vector 800 is a vector representing the amount and direction of a position change to the reference image region. The vertical component amount of the position change vector 800 represents the position change amount in the vertical direction for the position at which reference image data is acquired. The direction of the position change vector 800 represents the direction of the position change to the reference image region.

The position change amount derivation portion 402 derives a representative value of the component amounts of motion vectors so that the position change amount in the vertical direction for the reference image region to be stored in the reference image buffer 202 is determined based on the magnitude of vertical motion of an analysis target block group 601 which is located on the line immediately preceding (immediately above) the line of the encoding target block 500"A". The representative value of the component amounts of motion vectors is a mode of the respective component amounts of the motion vectors, for example. This mode may also be a median or an average, for example. In FIG. 4, the vertical component amount of a to-be-analyzed. motion vector 700-27 of an encoding block "27" is the median of the vertical component amounts of motion vectors 700-24 to 700-30. As such, the position change amount derivation portion 402 determines the value of the position change amount for the reference image region as a value equal to the vertical component amount of the motion vector 700-27. That is, the position change amount derivation portion 402 determines the value of the position change amount for the reference image region as a value equal to the median of the vertical component amounts of the motion vectors 700-24 to 700-30. The position change amount derivation portion 402 outputs position change amount information to the reference position determination portion 403. The analysis target block group 601 is a group of encoding blocks that have to-be-analyzed motion vectors.

The position change amount derivation portion 402 may also derive a representative value of the component amounts of motion vectors so that the position chance amount in the vertical direction for the reference image region to be stored in the reference image buffer 202 is determined based on the magnitude of vertical motion or the analysis target block group 601 which are located on consecutive multiple lines above the line of the encoding target block 500 "A". This makes the position change amount follow an averaged image motion, so that the position change amount derivation portion 402 can prevent the position change amount from excessively responding to an abrupt (noise-like) motion occurring in an image.

The reference position determination portion 403 determines the position at which reference image data is acquired among positions on the reference image frame based on the position change amount in order to reduce the size (data capacity) of the reference image buffer 202, reference image data which is stored in the reference image buffer 202 is reference image data for the motion vector search range in the motion searching process.

Where the position of the search range is not changed in accordance with the position change amount, the center of a rectangular search range in the reference image frame coincides with the position of the encoding target block in the encoding target frame. Where the position of the rectangular search range is not changed in the reference image frame, the transfer rate of reference image data which is transferred from the external memory 20 to the reference image buffer 202 limited at: "(the horizontal width of the block)×(the vertical width of the search range)/processing time for one encoding target block". Thus, the vertical width of the search range affects both the size of the reference image buffer 202 and the transfer rate of reference image data transferred from the external memory 20 to the reference image buffer 202. The horizontal width of the search range affects the size (data capacity) of the reference image buffer 202.

Figure 5:
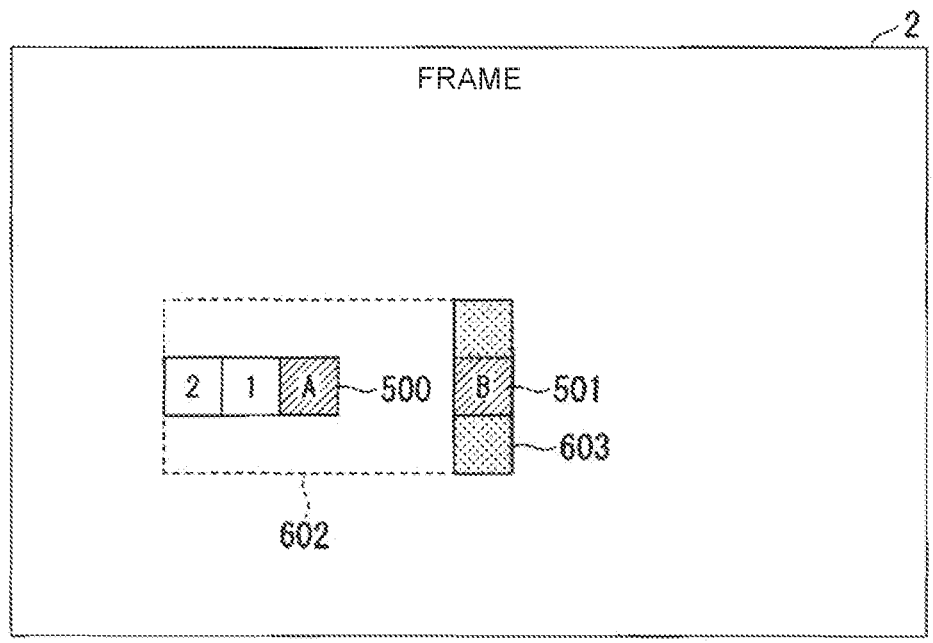
FIG. 5 shows an example of a search range in the first embodiment.

FIG. 5 shows an example of the search range. In FIG. 5, the shape of a search range 602 is rectangular. The size of the search range is 320×192 pixels. Where the position of the search range is not changed during the encoding process on the encoding target block 500"A", the search range 602 is a range of "±128×±64" pixels including the encoding target block 500"A". In order that the reference image data in the search range 602 is stored in the reference image buffer 202 without being discontinuous in the horizontal direction, the reference image buffer 202 need to acquire from the external memory 20 reference image data for a reference image region with a horizontal width of "64" pixels ranging from the 128th pixel to the 192nd pixel to the right (in the horizontal direction) of the position of the encoding target block 500"A", during the encoding process on the encoding target block 500"A".

in FIG. 5, if the position of the search range is not changed during the encoding process on the encoding target block 500"A", a region including the position at which reference image data is acquired is a reference image region 603. The range of the horizontal width (in the horizontal direction) of the reference image region 603 in the reference image frame is, with respect to the same position as the position of the encoding target block 500"A" in the encoding target frame, a range with a horizontal width of "64" pixels ranging from the 128th pixel to the 192nd pixel as counted to the right from that same position. The vertical range of the reference image region 603 in the reference image frame is, with respect to the same position as the position of the encoding target block 500"A" in the encoding target frame, a range with a vertical width of "192" pixels including that same position.

In FIG. 5, the center of the reference image region 603 (reference image reading region) coincides with the center of an encoding target block 501"B", which is the next block for encoding. During the encoding process on the encoding target block 500"A", the reference image buffer 202 acquires reference image data for the reference image region 603, which is "(the horizontal width of the encoding block)×(the vertical width of the search range) (=64×192)" pixels, from the external memory 20. The size of the reference image data stored in the reference image buffer 202 is then (320×192) pixels+(64×192) pixels.

In this manner, the reference position determination portion 403 vertically changes the position of the reference image region 603 which will be transferred to the reference image buffer 202 from the external memory 20 during the time for the encoding process on one encoding target block (processing time for one encoding target block), based on a result of a motion searching process in already encoded encoding blocks. This allows the reference position determination portion 403 to adaptively determine the position of a search range having the reference image data which is to be stored in the reference image buffer 202 among positions on the reference image frame in units of encoding blocks based on position change amount information, without a change to the data capacity of the reference image buffer 202 (buffer size) and the transfer rate.

Figure 6:
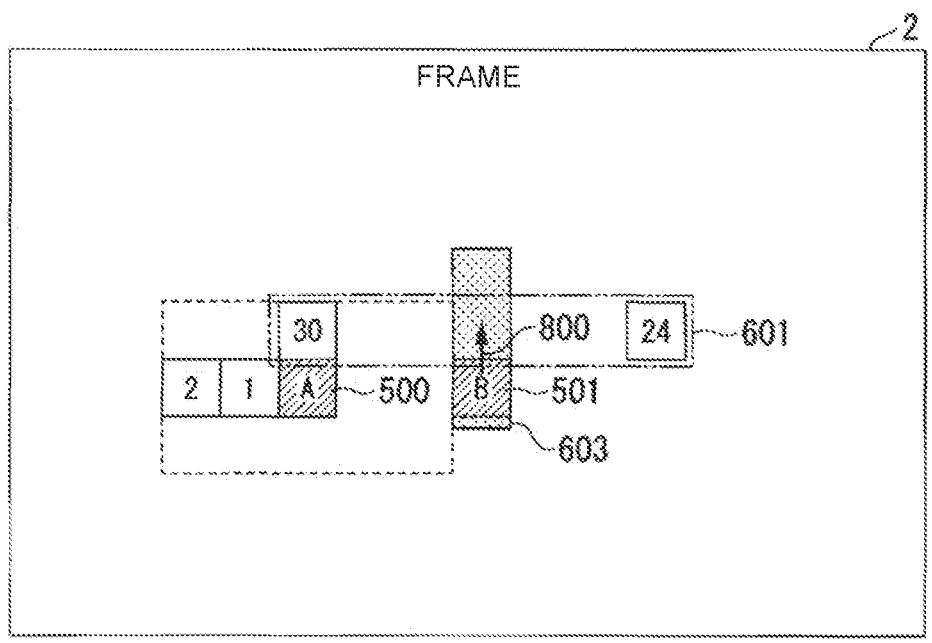
FIG. 6 shows an example of the search range and a reference image acquisition position in the first embodiment.

FIG. 6 shows an example of the search range and the reference image acquisition position. The reference position determination portion 403 changes the motion vector search range and the reference image acquisition position information according to the position change amount which was determined based on the representative value of the vertical component amounts of motion vectors derived in the example shown in FIG. 4.

As a result of deriving the representative value of the vertical component amounts of motion vectors for the analysis target block group 601, the vertical component amount of the position change vector 800 represents a position change amount in upward direction.

In this case, the reference position determination portion 403 determines a position which has been changed in position upward by the position change amount according to the position change vector 800 with respect to the position of the encoding target block 501"B", i.e., the next block for encoding, to be the center of the reference image region 603 which will be stored in the reference image buffer 202 for the encoding of the target block 501"B". During the encoding process on the encoding target block 500"A", the reference image buffer 202 acquires the reference image data for the reference image region 603, which has been changed in position upward by the position change amount, from the external memory 20.

In FIG. 6, due to design of the analysis start position parameter and the analysis end position parameter, the range of the analysis target block group 601 is a horizontally symmetrical range with three encoding blocks to the left and three encoding blocks to the right with respect to the position of the encoding block immediately above the encoding target block 501"B". This allows the reference position determination portion 403 to sensitively reflect the motion vector in the encoding block immediately above the encoding target block 501"B" into determination of reference image acquisition position information.

The analysis start position parameter and the analysis end position parameter serve as parameters that indicate the motion vectors of which already encoded encoding blocks are to be reflected into the position change to the reference image region which will form the motion vector search range for the next encoding target block to be encoded.

Where the representative value of the vertical component amounts of multiple motion vectors is an average of the vertical component amounts of the multiple motion vectors, the position change amount derivation portion 402 determines the position change amount for the reference image region among positions on the reference image frame based on a simple moving average of the vertical component amounts of the multiple motion vectors. In this case, the greater the difference between the value of the analysis start position parameter and the value of the analysis end position parameter is, the more the amount of motion in images in the encoding target frame 2, which is a time over a long term, is reflected in the determination of the position change amount for the reference image region. This allows the position change amount derivation portion 402 to determine a position change amount representing more smoothed motion.

Multiple combinations of the analysis start position parameter and the analysis end position parameter may be prepared. The position change amount derivation portion 402 may define an encoding block group (analysis target block group) having to-be-analyzed motion vectors based on one or more combinations from the multiple combinations prepared. For example, in addition to the analysis target block group 601, the position change amount derivation portion 402 may define multiple encoding blocks on the same line to the left of the encoding target block 501"B" (in FIG. 6, the encoding block "2", the encoding block "1" and an encoding block "A", for instance) as an encoding block Group (analysis target block group) with to-be-analyzed motion vectors. This allows the position change amount derivation portion 402 to reflect the result of analysis of the respective motion vectors in both the encoding block on the upper side of the encoding target block and the block on the left side of the encoding target block into the position change to the reference image region.

In FIG. 6, the reference position determination portion 403 has chanced reference image acquisition position information in accordance with the position chance amount determined based on the derived representative value of the vertical component amounts of motion vectors.

Here, the external memory 20 stores reference image data in the external memory 20 based on an address for each of multiple sets of pixel data contained in the reference image data. The reference position determination portion 403 may thus change the vertical reference image acquisition position in accordance with how reference image data is stored in the external memory 20.

For instance, where a set of 8×4-pixel reference image data is stored in the external memory 20 based on one address and the value of the position change amount is not a multiple of 4, one more piece of address information would be necessary for transfer processing compared to when the value of the position change amount is a multiple of 4. As a result, unnecessary data would occur and the transfer rate would increase. To prevent increase in the transfer rate, the reference position determination portion 403 may change the value of the position change amount determined by the position change amount derivation portion 402 to a multiple of a predetermined integer (e.g., a multiple of 4). The reference position determination portion 403 outputs the changed position change amount information to the reference image buffer 202.

Figure 7:
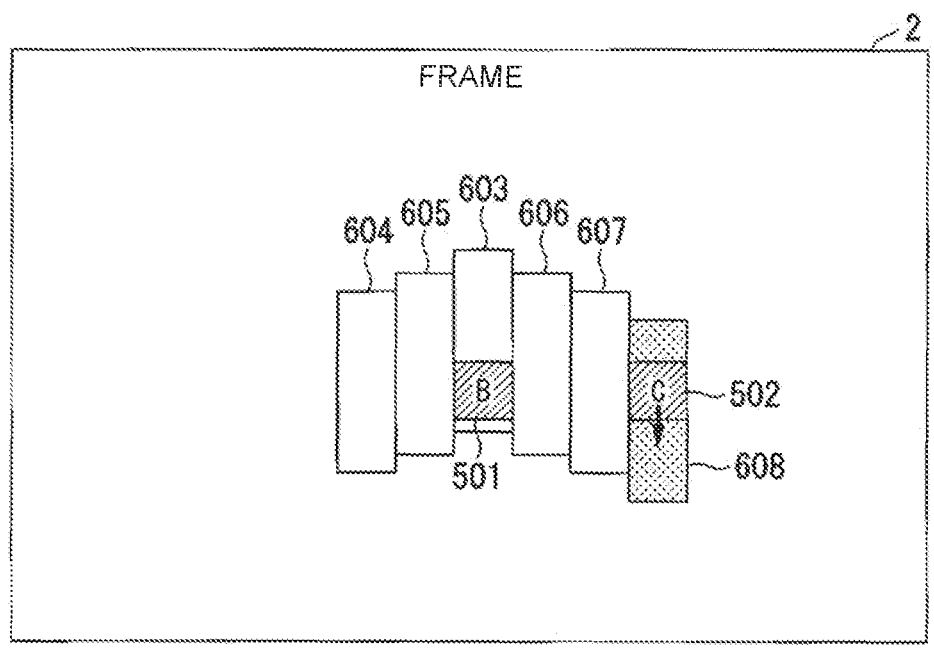
FIG. 7 shows an example of reference image regions for which reference image data is stored in a reference image buffer in the first embodiment.

FIG. 7 shows an example of reference image regions for which reference image data is stored in the reference image buffer 202 Reference image regions 603 to 607 are the motion vector search range for the encoding target block 501"B". If each of the encoding target blocks from the encoding target block 500"A" to the encoding target block 501"B" shown in FIG. 6 has been encoded, the reference image buffer 202 has stored the reference image data for the respective reference image regions 603 to 607.

In FIG. 7, since the position of the reference image region has been changed in the vertical direction for each encoding block, the search range of (320×192) pixels is formed from the reference image regions 603 to 607. As shown in FIG. 7, the shape of the search range does not have to be rectangular.

During the encoding process on the encoding target block 501"B", the reference image buffer 202 acquires the reference image data for a reference image region 608, which is included in the motion vector search range for an encoding target block 502"C", or the next block for encoding, from the external memory 20. The size of the reference image region 608 is 64×192 pixels. The size of the reference image data stored in the reference image buffer 202 is then (320× 192) pixels (64×192) pixels.

This allows the reference position determination portion 403 to adaptively determine the position of the region of reference image data (search range) to be stored in the reference image buffer 202 among positions on the reference image frame in units of lines based on position change amount information, without change to the data capacity of the reference image buffer 202 (buffer size) and the transfer rate. The reference position determination portion 403 outputs the reference image acquisition position information determined based on the position change amount to the reference image buffer 202. The reference image buffer 202 derives an address in the external memory 20 corresponding to the reference image acquisition position and the like. The reference image buffer 202 outputs a read request signal to the external memory 20 based on the derived address and the like.

In FIG. 7, the reference position determination portion 403 has determined the position of the reference image region (reference image reading region) which is to be transferred to the reference image buffer 202 from the external memory 20 based on the position change amount derived for each encoding block. The reference position determination portion 403 may determine the position of the reference image region which is to be transferred to the reference image buffer 202 from the external memory 20 based on the position change amount derived for each set of multiple encoding blocks.

Hereinafter, a parameter that represents a number of encoding blocks per which motion vectors are analyzed once and its result is reflected into a position change to the reference image region (the search range) will be called an "analysis frequency parameter". When the value of the analysis frequency parameter is "1" for example, the reference position determination portion 403 determines the position of the reference image region which is to be transferred to the reference image buffer 202 from the external memory 20 based on the position change amount derived for each encoding block.

Figure 8:
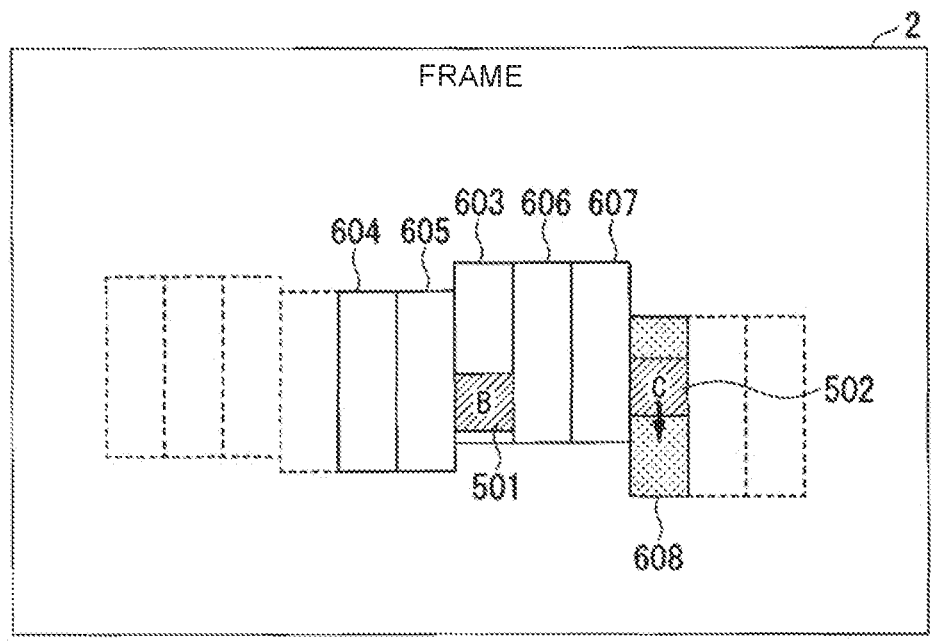
FIG. 8 shows an example of reference image regions when the value of an analysis frequency parameter is "3" in the first embodiment.

FIG. 6 shows an example of reference image regions when the value of the analysis frequency parameter is "3". The greater the value of the analysis frequency parameter, the longer the horizontal width of a combination of multiple reference image regions (in FIG. 8, a combination of reference image regions 603, 606 and 607) is, so that the shape of a search range including the combination of these reference image regions will be closer to a rectangle. The greater the value of the analysis frequency parameter, the greater the difference in. position change amount between combinations of reference image regions will be, so that the reference image acquisition position tends to vary more greatly.

In this manner, the reference position determination portion 403 can adjust the effect that is given by multiple pieces of motion vector information of already encoded encoding blocks on the position of the reference image region and the position change amount by using two parameters, i.e., the difference between the analysis start position parameter and the analysis end position parameter, and the analysis frequency parameter.

The reference position determination portion 403 may give weights different from each other to the respective motion vectors of the analysis target blocks that are determined based on the analysis start position parameter and the analysis end position parameter.

The reference position determination portion 403 may derive a weighted moving average of the vertical component amounts of motion vectors based on weight coefficients for giving weights. The reference position determination portion 403 may set greater weight coefficients for the motion vectors of encoding blocks at positions closer to the center of the analysis target block group 601 than the weight coefficients for motion vectors of other encoding blocks. In FIG. 4, for example, the reference position determination portion 403 may make the weight coefficient for a motion vector 700-27 of an encoding block "27" relatively large, and make the weight coefficient for a motion vector 700 of each of encoding blocks "24" and "30" relatively small. By doing so, multiple pieces of motion vector information for already encoded encoding blocks are reflected more in the reference image regions of encoding blocks closer to the encoding target block 501"B" shown in FIG. 6. The reference image buffer 202 can store reference image regions that can respond to complicated motions in encoding target frames.

Figure 9:
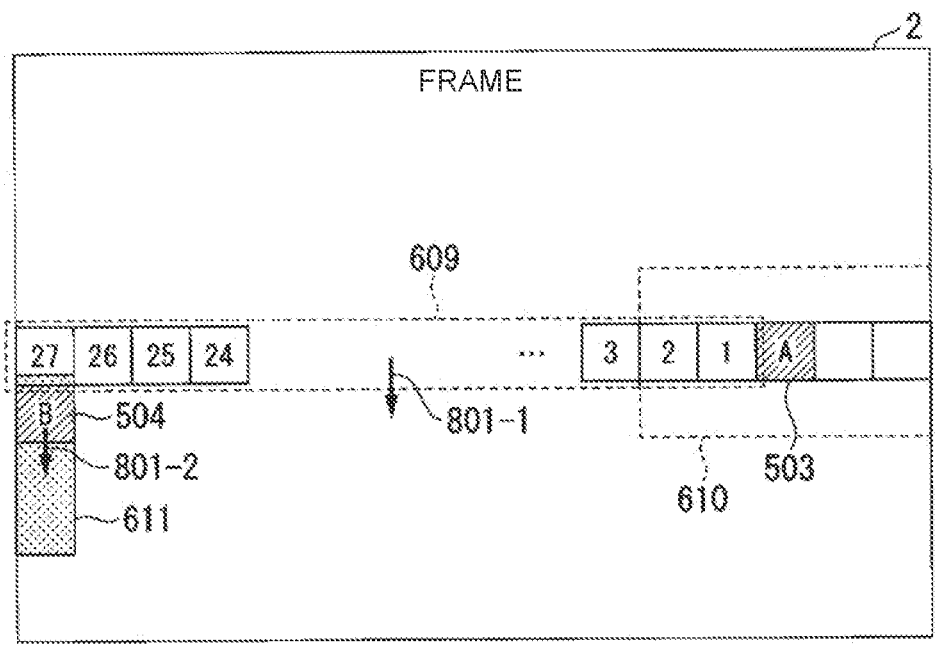
FIG. 9 shows an example of position chance in units of lines in the first embodiment.

FIG. 9 shows an example of position chance in units of lines. The value of the analysis start position parameter is 27 as an example. The value of the analysis end position parameter is 1 as an example. The value of the analysis frequency parameter is 30 as an example. The reference position determination portion 403 may change the position of the reference image region in units of lines based on a predefined unit parameter. During the encoding process on the encoding target block 503"A", a search range 610 contains the right edge of the encoding target frame. Thus, the reference image buffer 202 acquires reference image data for a reference image region 611, which is included in the motion vector search range for an encoding target block 504"B" belonging to the next line after the line to which the encoding target block 503"A" belongs, from the external memory 20.

In FIG. 9, due to design of the analysis start position parameter and the analysis end position parameter, an analysis target block group 609 is formed from all the encoding blocks on the left on one line with respect to the position of the encoding target block 503"A". That is, the analysis target block group 609 contains many encoding blocks on the one line to which the encoding target block 503"A" belongs. This allows the position change amount derivation portion 402 to reflect the motion vector information for each encoding block in such an analysis target block group 609 into the determination of the position change amount for the reference image region 611, which is included in the motion vector search range for the encoding target block 504"B" belonging to the next line after the line to which the encoding target block 503"A" belongs.

In FIG. 9, the position change amount derivation portion 402 can reflect the motion vector information for each encoding block in the analysis target block group 609, which includes almost all of the encoding blocks on the one line, into the determination of the position change amount for the reference image region 611, which is included in the motion vector search range for the encoding target block 504"B" belonging to the next. line after the line to which the encoding target block 503"A" belongs. For example, the position change amount derivation portion 402 makes a position change vector 801-2 for the reference image region 611, which is included in the motion vector search. range for the encoding target block 504"B", equal to a position change vector 801-1 representing the position change amount which was determined based on a representative value of the vertical component amounts of the motion vectors of the respective encoding blocks in the analysis target block group 609.

Figure 10:
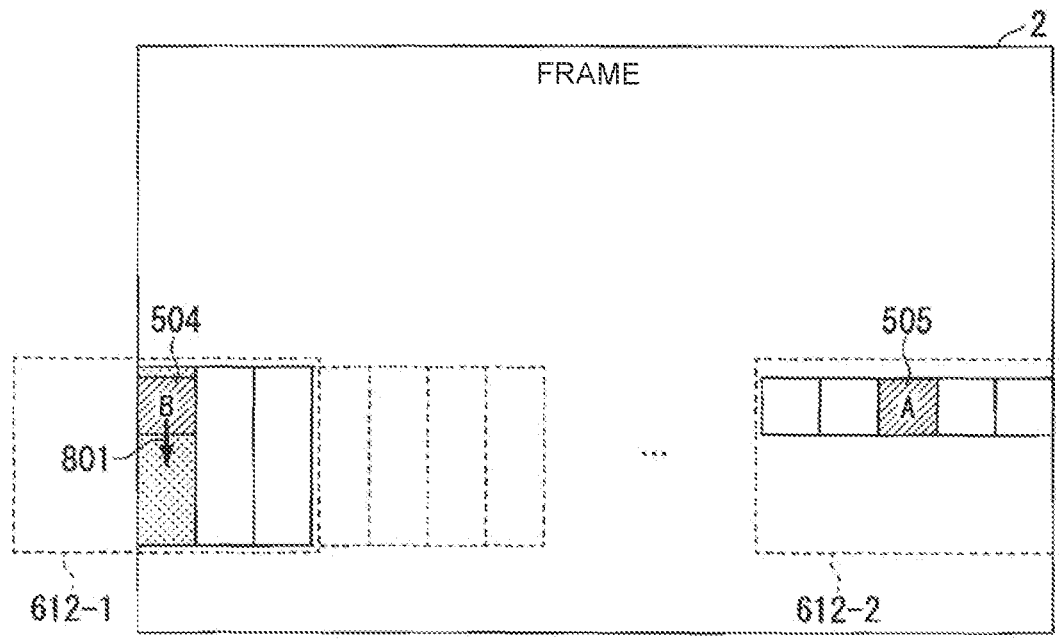
FIG. 10 shows an example of reference image regions in the first embodiment.

FIG. 10 shows an example of reference image regions. The value of the analysis start position parameter is 30 an example. The value of the analysis and position parameter is 24 an example. The value of the analysis frequency parameter is 30 an example. If the encoding target block 504"B" has been encoded, the reference image buffer 202 has stored the reference image data for each reference image region in a search range 612-1. If an encoding target block 505"C" has been encoded, the reference image buffer 202 has stored the reference image data for each reference image region in a search range 612-2.

When the value of the analysis frequency parameter is equal to the number of encoding blocks in the search range 612-1 in the horizontal direction, the position change amount and position. change direction that are represented by the position change vector 801-2 for the encoding target block 504"B" at the left edge of the line of the encoding target frame will not be changed until the motion vector searching process for the encoding target block 505"C" at the right edge of the same line is completed. As such, in FIG. 10, the shape of the search range 612 is rectangular.

If the encoding block currently undergoing the encoding process is the encoding target block 505"C", the motion vector searching process for each of 30 (=1920/64) encoding blocks including the encoding target block 503"A", which is now an already encoded encoding block, has been completed. As such, the reference position determination portion 403 analyzes these motion vectors for which the searching process has been completed. The reference position determination portion 403 determines the position change amount for a reference image region which is included in the motion vector search range, for each encoding target block that belongs to the next line after the line of an encoding target block which has become an already encoded encoding block.

In this manner, the reference position determination portion 403 can change the position of the reference image region in units of lines based on the analysis start position parameter, the analysis end position parameter and the analysis frequency parameter. For example, where the shape of the search range is limited to a rectangular shape, the reference position determination portion 403 changes the position of the reference image region in units of lines. By changing the position of the reference image region in units of lines, the reference position determination portion 403 can lower the frequency of changes to the position of the reference image region.

Next, an exemplary operation of the encoding system 1 is described.

Figure 11:
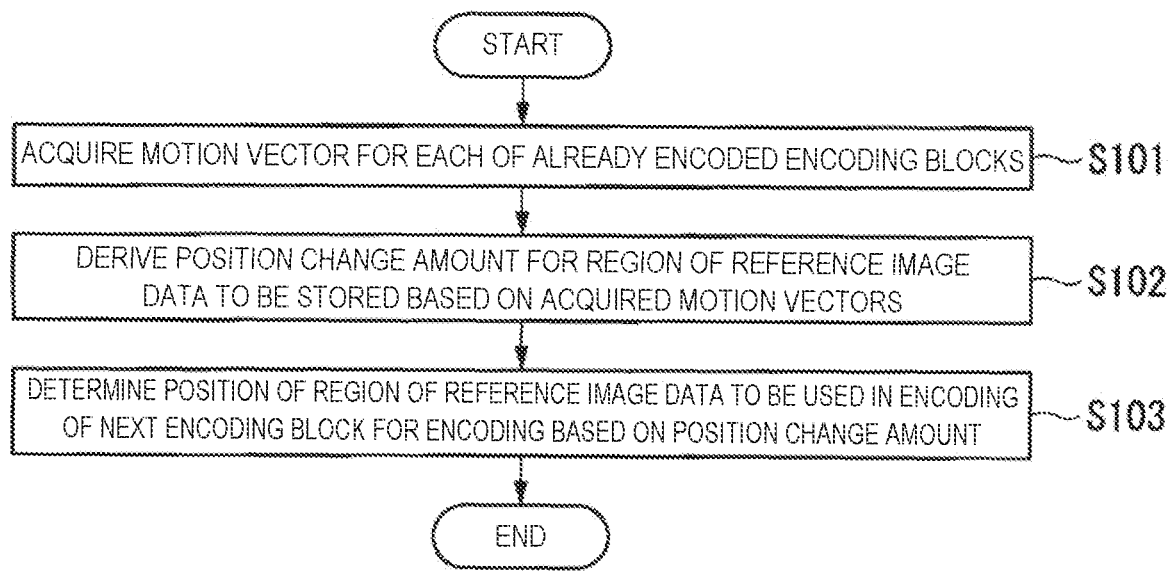
FIG. 11 is a flowchart illustrating an exemplary operation of an encoding system in the first embodiment.

FIG. 11 is a flowchart illustrating an exemplary operation of the encoding system 1. The motion vector result storage portion 401 (motion vector acquisition portion) acquires a motion vector for each one of already encoded encoding blocks (step S101). The position change amount derivation portion 402 derives the position change amount for a region of reference image data (reference image region) to be stored in the reference image buffer 202 based on the acquired motion vector (step S102). The reference position determination portion 403 (reference region determination portion) determines the position of a region of reference image data to be used in encoding of an encoding target block which is the next encoding block for encoding after the already encoded encoding block, based on the derived position change amount (step S103).

As described above, the encoding device 10 (reference region determination. device) in the first embodiment determines the reference region which is to be stored in the reference image buffer. The encoding device 10 includes the motion vector result storage portion 401 (motion vector acquisition portion), the position change amount derivation portion 402, and the reference position determination portion 403 (reference region determination portion). The motion vector result storage portion 401 acquires the motion vector for each one of already encoded blocks. The position change amount derivation portion 402 derives the position change amount for the reference image region (reference region) based on the acquired motion vectors. The reference position determination portion 403 determines the position of the reference image region (reference region) to be used for encoding of the next encoding block for encoding after the already encoded encoding blocks based on the position change amount.

Thus, the encoding device 10 in the first embodiment can deter reduction in the encoding efficiency even when the buffer stores reference image data for only a portion of the reference image frame.

That is, since the encoding device 10 changes the position of the search range including the reference image region in units of encoding blocks or lines in a reference image frame referenced from the encoding target frame, it can deter reduction in the encoding efficiency even when only the reference image data for the search range is stored in the reference image buffer 202.

The reference position determination portion 403 determines the position of the motion vector search range for the encoding target block in the reference image frame in units of encoding blocks in real time based on past motion vector information found by the inter prediction processing section 103. A position which is in the reference image frame referenced from the encoding target frame and which is the position of a region of reference image data to be acquired from the external memory 20 by the reference image buffer 202 may be designed as described with FIG. 6 or FIG. 9. This allows the encoding device 10 to appropriately respond to motions in object images captured in encoding target. frames and to improve the encoding efficiency while controlling an increase in the data capacity of the reference image buffer and the transfer rate of reference image data transferred from the external memory 20.

Second Embodiment

A second embodiment differs from the first embodiment in that the reference image acquisition position determination section determines the position of the reference image region based on motion vector information, cumulative difference values, and block size information. In the second embodiment, differences from the first embodiment are discussed.

A value such as the cumulative difference value can serve as a measure that indicates how correct a motion vector as a result of motion searching process is (the accuracy of the motion vector). As such, the position change amount derivation portion 402 may also derive a position change amount based on a combination of multiple kinds of information other than motion vector information.

The reference position determination portion 403 may determine the region of reference image data to be stored in the reference image buffer 202 based on the position change amount thus derived.

in a moving image encoding standard such as H.265/HEVC, a Coding Tree Unit of a size of 64×64 pixels or so can be subdivided in four-fold split. In such a case, even if the number of Coding Tree Units to be analyzed is designated with the analysis start position parameter and the analysis end position parameter, the number of motion vectors to be acquired by the position change amount derivation portion 402 will be greater than the number of Coding Tree Units for which motion vectors are analyzed.

Therefore, the size of an encoding block having a motion vector can be different from one encoding block to another.

Accordingly, the position change amount derivation portion 402 may derive the position change amount based on block size information (division information) and motion vector information from motion vector search results for already encoded encoding blocks.

Figure 12:
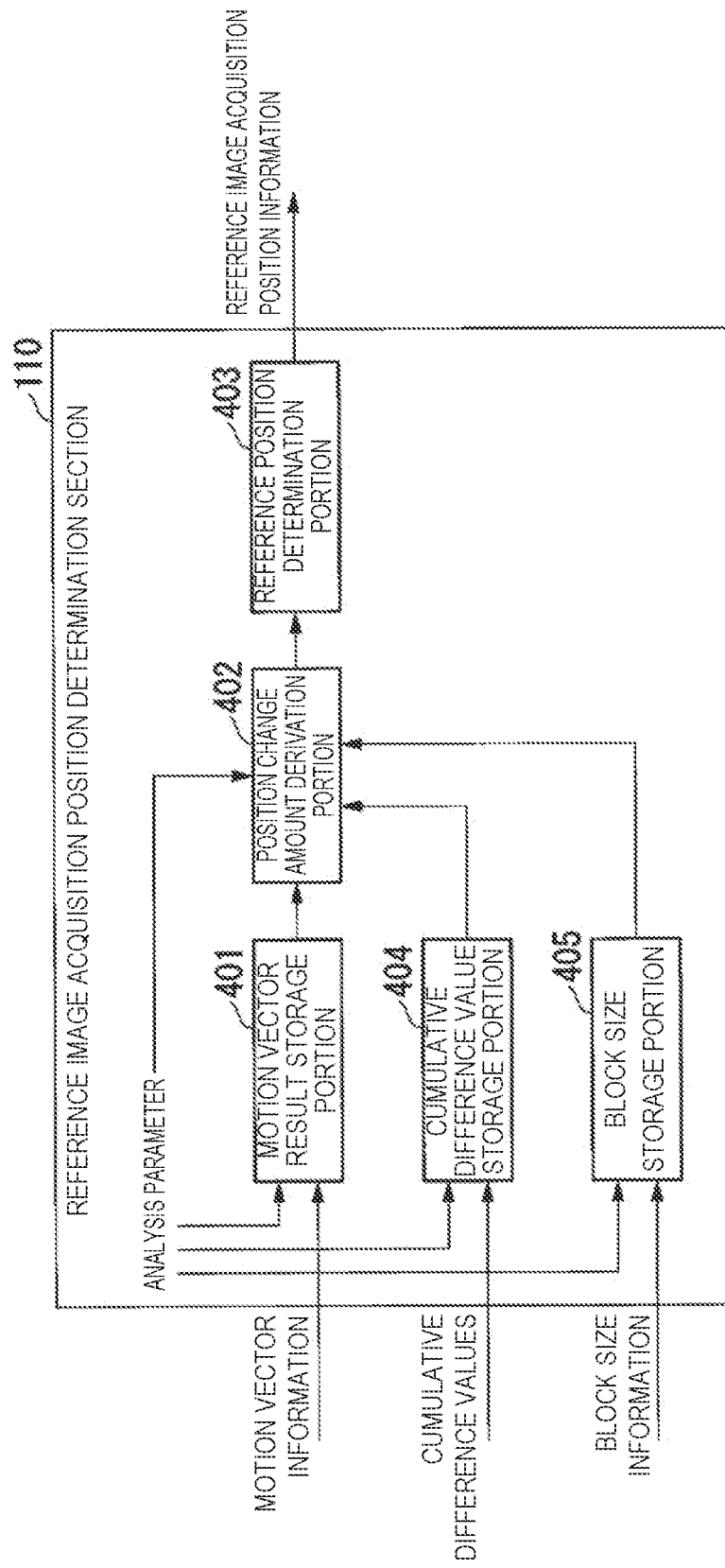
FIG. 12 shows an exemplary configuration of the reference image acquisition position determination section in a second embodiment.

FIG. 12 shows an exemplary configuration of the reference image acquisition position determination section 110. The reference image acquisition position determination section 110 includes the motion vector result storage portion 401, the position change amount derivation portion 402, the reference position determination portion 403, a cumulative difference value storage portion 404, a block size storage portion 405.

The motion vector result storage portion 401 stores motion vector information for each of the encoding blocks ranging from the encoding block ate, a position that precedes by one or more blocks (a fixed value) to the encoding block at the immediately preceding position with respect to the position of the encoding target block currently undergoing the encoding process, based on the analysis start position parameter.

The cumulative difference value storage portion 404 acquires the cumulative difference values for when the motion vectors were used in encoding from the inter prediction processing section 103. The cumulative difference value storage portion 404 stores a cumulative difference value for each of the encoding blocks ranging from the encoding block at the position that precedes by one or more blocks (a fixed value) to the encoding block at the immediately preceding position with respect to the position of the encoding target block currently undergoing the encoding process, based on the analysis start position parameter.

The cumulative difference value storage portion 404 deletes the oldest cumulative difference value stored in the cumulative difference value storage portion 404 from the cumulative difference value storage portion 404 every time the encoding of an encoding target block is completed. The cumulative difference value storage portion 404 stores the newest acquired cumulative difference value in the cumulative difference value storage portion 404. In this manner, the cumulative difference value storage portion 404 updates the data stored in the cumulative difference value storage portion 404.

The block size storage portion 405 acquires block size information, which is information representing into which size an encoding block was divided when the motion vector was used in encoding, from the inter prediction processing section 103. The block size storage portion 405 stores block size information for each of the encoding blocks ranging from the encoding block at the position that precedes by one or more blocks (a fixed value) to the encoding block at the immediately preceding position with respect to the position of the encoding target block currently undergoing the encoding process, based on the analysis start position parameter.

The block size storage portion 405 deletes the oldest block size information stored in the block size storage portion 405 from the block size storage portion 405 every time the encoding of an encoding target block is completed. The block size storage portion 405 stores the newest acquired block size information in the block size storage portion 405. In this manner, the block size storage portion 405 updates the data stored in the block size storage portion 405.

The position change amount derivation portion 402 acquires one or more pieces of motion vector information for already encoded encoding blocks from the motion vector result storage portion 401. The position change amount derivation portion 402 acquires one or more cumulative difference values for the already encoded encoding blocks from the cumulative difference value storage portion 404. The position change amount derivation portion 402 acquires one or more pieces of block size information for the already encoded encoding blocks from the block size storage portion 405.

The position change amount derivation portion 402 analyzes the vertical component amounts (amount of motion) of the motion vectors in the already encoded encoding blocks based on one or more analysis parameters given by the designer or the like, the motion vectors, the cumulative difference values, and block size information.

Figure 13:
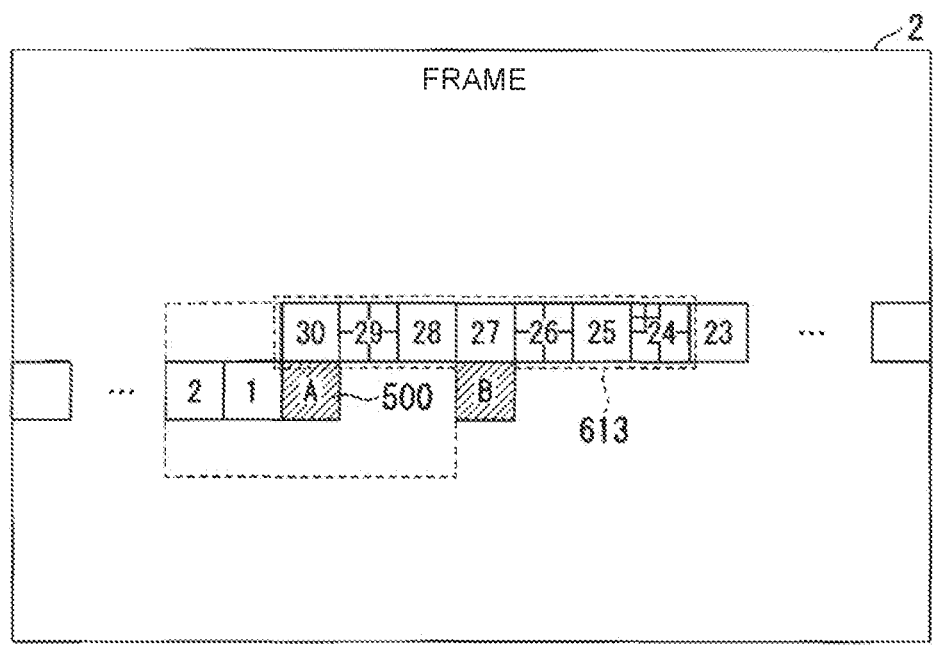
FIG. 13 shows an example of encoding blocks in the second embodiment.

FIG. 13 shows an example of encoding blocks. The value of the analysis start position parameter is 30 an example. The value of the analysis end position parameter is 24 an example. An analysis target block group 613 is seven encoding blocks (Coding Tree Units) from an encoding block "24" to an encoding block "30", which have to-be-analyzed motion. vectors.

In the analysis target block group 613, the encoding block "24", an encoding block "26" and an encoding block "29" have been divided as an example. The number of pieces of to-be-analyzed motion vector information, the number of cumulative difference values, and the number of pieces of block size information as size information for encoding blocks are all 19. The position change amount derivation portion 402 has three weight coefficients: a weight coefficient "$E_i$" for the block size of the ith encoding block, a weight coefficient "$F_i$" for the cumulative difference value of the ith encoding block, and an initial weight coefficient "$G_i$" for the ith encoding block. A position change amount that is determined based on a representative value of the vertical component amounts of motion vectors is represented as Expression (1), using a vertical component amount (amount of motion) "$V_{yi}$" of the motion vector of the ith encoding block:

[Math. 1]

$$\frac{\sum E_i \cdot F_i \cdot G_i \cdot Vy_i}{\sum E_i \cdot F_i \cdot G_i} \quad (1)$$

The weight coefficient "$E_i$" for the block size shown in Expression (1) is defined as a value corresponding to the area of the ith encoding block, for example. In this case, motion vector information will be reflected more strongly in the position change amount as the area of the encoding block having that motion vector is larger. The weight coefficient "$F_i$" for the cumulative difference value is defined as a smaller value as the cumulative difference value is greater. That is, the weight coefficient "$F_i$" for the cumulative difference value is defined as a smaller value as the accuracy of found motion vectors is lower. This allows the position change amount derivation portion 402 to derive a position change amount based on the accuracy of found motion vectors.

FIG. 14 shows an example of a weight coefficient table for cumulative difference values. In the weight coefficient table for cumulative difference values, an average error per pixel and a weight coefficient for a cumulative difference values are associated with each other. The position change amount derivation portion 402 acquires the weight coefficient table for cumulative difference values. The position change amount derivation portion 402 may prestore the weight coefficient table for cumulative difference values therein.

The position change amount derivation portion 402 derives a normalized cumulative difference value based on the acquired cumulative difference value and block size information. That is, the position change amount derivation portion 402 derives an average error per pixel, which is the result of dividing the cumulative difference value by the block size. The position change amount derivation portion 402 acquires the "weight coefficient for the cumulative difference value" that is associated with the "average error per pixel" in the weight coefficient table for cumulative difference values from the weight coefficient table for cumulative difference values.

The initial weight coefficient "$G_i$" shown in Expression (1) represents an initial value for weighting the motion vectors of multiple encoding blocks in the analysis target block group when the block sizes of the encoding blocks and their cumulative difference values are equal among those encoding blocks. The position change amount derivation portion 402 can derive a representative value of the component amounts of vertical motion vectors in accordance with the block sizes of the encoding blocks and cumulative difference values (the accuracy of motion vector search) based on the initial weight coefficient "$G_i$".

When the block sizes of the encoding blocks and cumulative difference values are equal among multiple encoding blocks in the analysis target block group, the position change amount derivation portion 402 derives a weighted moving average of the vertical component amounts of motion vectors. When the block sizes of the encoding blocks and cumulative difference values are equal among multiple encoding blocks in the analysis target block group and if the initial weight coefficient "$G_i$" for all of the encoding blocks is a fixed value, the position change amount derivation portion 402 derives a simple moving average of the vertical component amounts of motion vectors.

The reference position determination portion 403 acquires position change amount information for the reference image region from the position change amount derivation portion 402. The reference position determination portion 403 determines the position of the region of the reference image data to be stored in the reference image buffer 202 among positions on the reference image frame based on the position change amount information. The reference position determination portion 403 outputs position information for the region of the reference image data to be stored in the reference image buffer 202 to the reference image buffer 202 as reference image acquisition position information.

As described above, the encoding device 10 (reference region determination device) in the second embodiment includes the position change amount derivation portion 402. The position change amount derivation portion 402 derives a position change amount for the reference image region (search range) based on the acquired motion vectors and block size information (division information) for already encoded encoding blocks. The position change amount derivation portion 402 may derive the position change amount in accordance with the accuracy of the acquired motion vectors (e.g., cumulative difference values).

This allows the encoding device 10 in the second embodiment to deter reduction in the encoding efficiency even when the buffer stores reference image data for only a portion of the reference image frame.

The encoding device 10 can change the vertical position of the search range in units of encoding blocks so as not to increase the buffer size and the transfer rate of reference image data transferred from the external memory 20. The encoding device 10 can change the position of the motion vector search range for the next encoding target block for encoding in units of encoding blocks in accordance with the result of motion vector search for already encoded encoding blocks. Since the shape of the search range is not limited to a rectangular shape on a precondition that the area of the search range is constant, the encoding device 10 can improve the encoding efficiency using a low transfer rate of reference image data and the reference image buffer 202 of a small buffer size.

The foregoing can be summarized as follows as an example.

The encoding device 10 includes the reference image buffer 202 and the reference image acquisition position determination section 110. The reference image buffer 202 temporarily stores a reference image stored in the external memory 20 for a motion vector searching process when the motion vector searching process and pixel value prediction are performed on an input image utilizing the temporal correlation with the reference image in encoding of a moving image.

The reference image acquisition position determination section 110 includes the motion vector result storage portion 401, the position change amount derivation portion 402 and the reference position determination portion 403. The motion vector result storage portion 401 acquires the analysis start position parameter, which can be set to an arbitrary natural number. The reference image acquisition position determination section 110 identifies a start block and a storage end block.

The start block refers to a macroblock or a Coding Tree Unit that is located at the number of the analysis start position parameter before an encoding target block, which is a macroblock or a Coding Tree Unit for which the motion vector searching process is being performed at a given time. The storage end block refers to a block (macroblock or CTU) for which the motion vector searching process has already finished and that is closest to the encoding target block in The order of the encoding process.

The motion vector result storage portion 401 stores the motion search result in the internal buffer of the motion vector result storage portion 401 for the storage target block group. The storage target block group refers to all macroblocks or Coding Tree Units that are located from the start block to the storage end block in the order of the encoding process. The motion vector result storage portion 401 updates the data stored in the buffer by updating the storage target block group every time the encoding target block advances by one macroblock or CTU.

The position change amount derivation portion 402 (vertical hopping amount analysis portion) acquires the analysis end position parameter and the analysis frequency parameter, which can be set to arbitrary natural numbers. The position change amount derivation portion 402 determines an analysis end block. The analysis end block refers to a macroblock or CTU that is located before the encoding target block by the number of the analysis end position parameter. The position change amount derivation portion 402 acquires, for the analysis target block group, a to-be-analyzed motion search result representing the motion search result for the analysis target block group from the buffer of the motion vector result storage portion 401. The analysis target block group refers to all macroblocks or CTUs that are located from the analysis start block to the analysis end block in the order of the encoding process. The position change amount derivation portion 402 determines and updates the vertical position change amount (the amount of hopping), which is a representative amount of motion in the vertical direction in the past, based on analysis of the to-be-analyzed motion search result at a timing of once per macroblocks and CTUs as many as the number of the analysis frequency parameter.

The reference position determination portion 403 acquires the position change amount for the vertical direction from a vertical position change amount analysis unit. The reference position determination portion 403 acquires a search vertical width parameter, which is equivalent to the vertical width of the search range for motion search, and a search horizontal width parameter, which is equivalent to the horizontal width of the search range for motion search. The reference position determination portion 403 determines the position of a reference image region within a rectangular range of "the search vertical width parameter×(the horizontal width of the encoding target block)" for each macroblock or Coding Tree Unit. The reference position determination portion 403 sets a reference point as a position which is advanced from the encoding target block by the number of pixels of the search horizontal width parameter in the order of processing, and determines the position away from the reference point in the vertical direction by the position change amount as the position of the reference image region in the rectangular range.

The reference image buffer 202 acquires the position of the reference image region in the rectangular range from the reference position determination portion 403. The reference image buffer 202 derives an address in the external memory 20 that corresponds to data in the reference image region in the rectangular range. The reference image buffer 202 transmits a read request to the external memory 20. The reference image buffer 202 temporarily stores the reference image data which is transferred from the external memory 20 in response Co the read request.

The motion vector result storage portion 401 saves motion vector information for past motion search results as to-be-analyzed motion search results for all the macroblocks or CTUs that correspond to the analysis target block group. The position change amount derivation portion 402 derives an average or a median for the vertical values of the motion vectors in the analysis target block group. The position change amount derivation portion 402 makes the value of the position change amount in the vertical direction equal to the derived average or median.

The position change amount derivation portion 402 acquires a relative distance weight coefficient. The relative distance weight coefficient is a parameter that is uniquely determined depending on how far a macroblock or a Coding Tree Unit is away from the encoding target block in the order of processing. The position change amount derivation portion 402 derives a weighted average based on the relative distance weight coefficient (weighting of the weighted average for the vertical values of motion vectors) and the vertical values of the motion vectors. The position change amount derivation portion 402 makes the value of the position change amount in the vertical direction equal to the weighted average.

The motion vector result storage portion 401 saves a block area value which represents a block of how much area possesses each motion vector and motion vector information as a to-be-analyzed motion search result, for all the macroblocks or Coding Tree Units corresponding to the analysis target block group. The position change amount derivation portion 402 derives a weighted average based on the block area value (weighting of a weighted average for the vertical value of the motion vector corresponding each block area information) and the vertical values of the motion vectors. The position change amount derivation portion 402 makes the value of the position change amount in the vertical direction equal to the weighted average.

The motion vector result storage portion 401 saves cumulative differences values representing motion search errors in the respective motion vectors and motion vector information as a to-be-analyzed motion search result for all the macroblocks or CTUs corresponding to the analysis target block group. The position change amount derivation portion 402 acquires the weight coefficient table for cumulative difference values. The position change amount derivation portion 402 extracts the weight coefficient for a cumulative difference value associated with the magnitude of each cumulative difference value from the weight coefficient table for cumulative difference values. That is, the motion vector result storage portion 401 uses the weight coefficient table for cumulative difference values to convert each one of the cumulative difference values of the analysis target block group to a weight coefficient for that cumulative difference value. The position change amount derivation portion 402 derives a weighted average based on the weight coefficients for the cumulative difference values (weighting of a weighted average for the vertical value of the motion vector corresponding to each block area information) and the vertical values of the motion vectors. The position change amount derivation portion 402 makes the value of the position change amount in the vertical direction equal to the weighted average.

The motion vector result storage portion 401 saves motion vector information, block area values and cumulative difference values as a to-be-analyzed motion search result, for all the macroblocks or Coding Tree Units corresponding to the analysis target block group. The position change amount derivation portion 402 uses the weight coefficient table for cumulative difference values to convert each of the cumulative difference values of the analysis target block group to the weight coefficient for that cumulative difference value. The position change amount derivation portion 402 derives a weighted average based on the result of multiplying the weight coefficients for the cumulative difference values, the block area values and relative distance weight coefficients (the result of multiplying weightings of the weighted average for the respective vertical values of the motion vectors), and the vertical values of the motion vectors. The position change amount derivation portion 402 makes the value of the position change amount in the vertical direction equal to the weighted average.

The reference region determination devices according to the above-described embodiments may be implemented with computers. In that case, a program for implementing their functions may be recorded in a computer-readable recording medium and the program recorded on the recording medium may be loaded into a computer system and executed to implement the reference region determination devices. A "computer system" as called herein is intended to include an OS and hardware such as peripherals. A "computer-readable recording medium" refers to a storage device such as a removable media like a flexible disk, magneto optical disk, ROM, and CD-ROM, or a hard disk integrated in a computer system. Further, a "computer-readable recording medium" may encompass a medium that dynamically holds a program for a short period of time, like a communications line in the case or transmitting the program over a network such as the Internet or a communications line such as a telephone line, and a program that holds the program for a certain amount of time, like volatile memory within a computer system serving as a server or a client in that case. The program may also be a program for implementing some of the functions described above, and further may implement the functions in combination with a program already recorded in the computer system, and may be implemented with a programmable logic device such as a FPGA (Field Programmable Gate Array).

While the embodiments of the present invention have been described in detail with reference to the drawings, specific configurations are not limited to the embodiments and designs and the like that fall within the scope of the invention are also encompassed.

INDUSTRIAL APPLICABILITY

The present invention can be applied to an encoding device for encoding moving images and the like.

REFERENCE SIGNS LIST 1 encoding system
2 encoding target frame
10 encoding device
20 external memory
101 raw image formatting section
102 intra prediction processing section
103 inter prediction processing section
104 prediction residual signal generation section
105 transform/quantization processing section
106 entropy coding section
107 dequantization/inverse transform processing section
108 decoded signal generation section
109 loop filtering section
110 reference image acquisition position determination section
200 encoding buffer unit
201 raw image buffer
202 reference image buffer
401 motion vector result storage portion
402 position change amount derivation portion
403 reference position determination portion
404 cumulative difference value storage portion
405 block size storage portion
500-505 encoding target block
600 storage target block group
601 analysis target block group
602 search range
603-608 reference image region
609 analysis target block group
610 search range
611 reference image region
612 search range
613 analysis target block group
700 motion vector
800-801 position change vector

The invention claimed is:

1. A reference region determination device for determining a reference region to be stored in a reference image buffer, the reference region determination device comprising:
a processor; and
a storage medium having computer program instructions stored thereon, when executed by the processor, perform to:
acquire a motion vector for each one of already encoded blocks;

derive a position change amount for the reference region based on a weighted average of a vertical component amount Vyi of the acquired motion vector of an ith encoded block of the already encoded blocks by using a weight coefficient Ei for a block size of the ith encoded block and a weight coefficient Fi for a cumulative difference value of the ith encoded block; and determine a position of the reference region to be used in encoding of a next block for encoding after the already encoded blocks based on the position change amount.

2. The reference region determination device according to claim 1, wherein the computer program instructions further perform to acquire the motion vector for each already encoded block out of the already encoded blocks that belongs to a line immediately preceding a line to which the next block for encoding belongs.

3. The reference region determination device according to claim 1, wherein the computer program instructions further perform to derive the position change amount based on the acquired motion vectors and on division information for the already encoded blocks.

4. The reference region determination device according to claim 3, wherein the computer program instructions further perform to derive the position change amount according to accuracy of the acquired motion vectors.

5. A non-transitory computer-readable medium having computer-executable instructions that, upon execution of the instructions by a processor of a computer, cause the computer to function as the reference region determination device according to claim 1.

6. The reference region determination device according to claim 1, wherein the weight coefficient Ei for the block size of the ith encoded block is a value corresponding to an area of the ith encoded block.

7. The reference region determination device according to claim 1, wherein the weight coefficient Fi for the cumulative difference value of the ith encoded block is a value corresponding to an average error per pixel that is a result of dividing the cumulative difference value by the block size of the ith encoded block.

8. The non-transitory computer-readable medium according to claim 5, wherein the instructions further perform to acquire the motion vector for each already encoded block out of the already encoded blocks that belongs to a line immediately preceding a line to which the next block for encoding belongs.

9. The non-transitory computer-readable medium according to claim 5, wherein the instructions further perform to derive the position change amount based on the acquired motion vectors and on division information for the already encoded blocks.

10. The non-transitory computer-readable medium according to claim 9, wherein the instructions further perform to derive the position change amount according to accuracy of the acquired motion vectors.

11. The non-transitory computer-readable medium according to claim 5, wherein the weight coefficient Ei for the block size of the ith encoded block is a value corresponding to an area of the ith encoded block.

12. The non-transitory computer-readable medium according to claim 5, wherein the weight coefficient Fi for the cumulative difference value of the ith encoded block is a value corresponding to an average error per pixel that is a result of dividing the cumulative difference value by the block size of the ith encoded block.

* * * * *